(12) United States Patent
Le Meur et al.

(10) Patent No.: US 10,746,030 B2
(45) Date of Patent: Aug. 18, 2020

(54) COMPOSITE BLADE AND METHOD OF MANUFACTURE

(71) Applicant: Ratier-Figeac SAS, Figeac (FR)

(72) Inventors: Kévin Le Meur, Figeac (FR); Patrice Brion, Lunan (FR); Ludovic Prunet, Themines (FR)

(73) Assignee: RATIER-FIGEAC SAS, Figeac (FR)

( * ) Notice: Subject to any disclaimer, the term of this patent is extended or adjusted under 35 U.S.C. 154(b) by 147 days.

(21) Appl. No.: 15/964,113

(22) Filed: Apr. 27, 2018

(65) Prior Publication Data

US 2018/0334912 A1 Nov. 22, 2018

(30) Foreign Application Priority Data

May 22, 2017 (EP) .................................... 17305593

(51) Int. Cl.
*F01D 5/28* (2006.01)
*B32B 5/02* (2006.01)
(Continued)

(52) U.S. Cl.
CPC .............. *F01D 5/282* (2013.01); *B29C 70/12* (2013.01); *B29D 99/0025* (2013.01); *B32B 5/024* (2013.01); *B32B 5/10* (2013.01); *B32B 5/26* (2013.01); *B32B 27/12* (2013.01); *B32B 27/18* (2013.01); *B32B 27/288* (2013.01); *B32B 37/06* (2013.01); *B32B 37/10* (2013.01); *B32B 37/185* (2013.01); *B64C 11/26* (2013.01); *F01D 5/3007* (2013.01); *B29K 2071/00* (2013.01); *B29K 2105/0845* (2013.01); *B29K 2105/12* (2013.01); *B29K 2307/04* (2013.01); *B32B 2260/023* (2013.01); *B32B 2260/046* (2013.01);
(Continued)

(58) Field of Classification Search
CPC ........................... F01D 5/282; F05D 2300/603
See application file for complete search history.

(56) References Cited

U.S. PATENT DOCUMENTS 5,129,787 A 7/1992 Violette et al.
5,454,693 A 10/1995 Aubry et al.
(Continued)

FOREIGN PATENT DOCUMENTS

EP 2105579 A2 9/2009
EP 2706241 A2 3/2014
(Continued)

OTHER PUBLICATIONS

Extended European Search Report for International Application No. 17305593.0 dated Dec. 5, 2017, 11 pages.

*Primary Examiner* — Igor Kershteyn
*Assistant Examiner* — Brian O Peters
(74) *Attorney, Agent, or Firm* — Cantor Colburn LLP

(57) ABSTRACT

A method is disclosed for manufacture of a composite blade with an airfoil and a root, wherein the blade comprises a core of chopped fibre composite material and a textile composite material encasing the chopped fibre core. The method comprises: forming a blade insert using chopped fibre composite; surrounding the blade insert with a plurality of layers of a textile in a textile composite material; and thermoforming the blade insert and the surrounding textile composite material in a thermoforming mould in order to consolidate the part.

14 Claims, 3 Drawing Sheets

(51) Int. Cl.

| | | |
|---|---|---|
| *B32B 5/10* | (2006.01) | |
| *B32B 5/26* | (2006.01) | |
| *B32B 27/12* | (2006.01) | |
| *B32B 27/18* | (2006.01) | |
| *B32B 27/28* | (2006.01) | |
| *B32B 37/06* | (2006.01) | |
| *B32B 37/10* | (2006.01) | |
| *B32B 37/18* | (2006.01) | |
| *B29D 99/00* | (2010.01) | |
| *F01D 5/30* | (2006.01) | |
| *B29C 70/12* | (2006.01) | |
| *B64C 11/26* | (2006.01) | |
| *B29K 105/08* | (2006.01) | |
| *B29K 71/00* | (2006.01) | |
| *B29K 105/12* | (2006.01) | |
| *B29K 307/04* | (2006.01) | |

(52) U.S. Cl.
CPC ... *B32B 2262/106* (2013.01); *B32B 2305/076* (2013.01); *B32B 2305/188* (2013.01); *B32B 2313/04* (2013.01); *B32B 2371/00* (2013.01); *B32B 2603/00* (2013.01); *F05D 2220/323* (2013.01); *F05D 2230/40* (2013.01); *F05D 2240/30* (2013.01); *F05D 2300/603* (2013.01)

(56) References Cited

U.S. PATENT DOCUMENTS

| | | |
|---|---|---|
| 5,462,408 A | 10/1995 | Coffy |
| 5,651,930 A | 7/1997 | Murching |
| 5,672,417 A | 9/1997 | Champenois et al. |
| 6,613,258 B1 | 9/2003 | Maison et al. |
| 6,788,180 B2 | 9/2004 | Haugs et al. |
| 8,318,067 B2 | 11/2012 | Northfield et al. |
| 8,715,556 B2 | 5/2014 | Murakami et al. |
| 9,234,430 B2 * | 1/2016 | Cairo ................ F01D 5/282 |
| 10,391,724 B2 * | 8/2019 | Parolini ............. B29C 70/44 |
| 10,414,487 B2 * | 9/2019 | Laurenceau ....... B29D 99/0025 |
| 2005/0026007 A1 | 11/2005 | Potter et al. |
| 2005/0260078 A1 | 11/2005 | Potter et al. |
| 2011/0002790 A1 | 1/2011 | Ebert et al. |
| 2013/0283820 A1 | 10/2013 | Muron et al. |
| 2015/0246480 A1 | 9/2015 | Sano |
| 2016/0186774 A1 | 6/2016 | Manicke et al. |

FOREIGN PATENT DOCUMENTS

| | | |
|---|---|---|
| EP | 2345528 B1 | 1/2016 |
| EP | 3026216 A1 | 6/2016 |

* cited by examiner

COMPOSITE BLADE AND METHOD OF MANUFACTURE

FOREIGN PRIORITY

This application claims priority to European Patent Application No. 17305593.0 filed May 22, 2017, the entire contents of which is incorporated herein by reference.

TECHNICAL FIELD

The present invention relates to a composite blade having an airfoil and a root and to a method of manufacture of such a composite blade. The blade may for example be a propeller blade or a fan blade for an engine such as a jet engine or gas turbine.

BACKGROUND

Fan blades are a key component of gas turbine engines such as jet engines and serve to guide airflow and draw air into the engine, as well as to protect the engine from environmental hazards. In modern jet engines they can also have a significant role in providing thrust by propelling air through the engine. The fan blades are generally the first component of the engine to contact incoming air. Thus they contribute greatly to setting up the airflow through the engine. Aircraft propeller blades provide the motive force for a propeller driven aircraft. They convert rotary motion from an engine into a force to drive the aircraft forward. As with fan blades they are the first component to contact the incoming air and the action of the propeller blades in generating thrust and guiding airflow is highly important to the operation of the aircraft.

Airfoil blades such as fan blades and propeller blades are exposed to outside factors such as varying air temperatures as well as bird impact and other damage from foreign objects. In addition, the blades must operate within the same envelope as the aircraft or gas turbine engine itself, which can include extremes of temperature, pressure, and airspeed. As a consequence the structure and manufacture of the blades is of great importance. The blades must be light and strong, as well as being tough enough to avoid or minimise damage when there is a high speed impact from a foreign object.

Various methods for manufacture of composite blades exist. For example, it is known to build up textile layers in a mould to form the shape of the blade, with the textile layers being pre-impregnated with a suitable matrix material such as a thermoplastic resin ('pre-preg' textiles) or with the matrix material being applied to each layer as the layers of textile are built up. Resin transfer manufacturing (RTM) techniques are also used, where the textile layers are prepared in a mould absent any kind of matrix material, and the matrix material is then injected into the mould or drawn into the mould via vacuum in order to surround the textile with the matrix. It is known for manufacturing processes to include a thermoforming and/or a curing stage after the textile and matrix material have been formed into a required shape. For example, see U.S. Pat. No. 871,556 where a turbine fan blade is formed via thermoforming with moulding steps using heat and pressure.

SUMMARY

Viewed from a first aspect the invention provides a method for manufacture of a composite blade with an airfoil and a root, the blade comprising a core of chopped fibre composite material and a textile composite material encasing the chopped fibre core, the method comprising: forming a blade insert using chopped fibre composite; surrounding the blade insert with a plurality of layers of a textile in a textile composite material; and thermoforming the blade insert and the surrounding textile composite material in a thermoforming mould in order to consolidate the part.

With this method the composite blade is formed from a combination of a chopped fibre core, provided by the blade insert, and a textile composite outer casing, formed by the textile composite layers that surround the blade insert. The outer casing may surround the blade insert by being sandwiched around it across a length and width of the blade, and optionally the outer casing may fully encase the blade insert and be placed around it on all sides including the length and width of the blade as well as its depth. This provides the blade with structural and material properties that can match those of equivalent blades manufactured using conventional techniques, whilst reducing the time and effort required to manufacture the blade.

Using a blade insert that comprises chopped fibre composite allows for advantages in the ease of forming the insert such that the blade can be manufactured with fewer steps and using less time than blades made with conventional textile layering methods. The blade insert may be formed by moulding in order to provide it with a required shape, which may for example be a contoured shape reflecting the required final contoured shape of the part of the blade where the blade insert is located. The blade insert may have a smooth curved surface without any steps. Forming the blade insert may include machining steps, which may be used to form contoured surfaces giving the required shape of the insert and/or to add machined features to a moulded shape, such as adding root details or forming anchoring features for securely coupling the insert to the surrounding textile layers.

The blade insert may advantageously be situated at a location where the cross-sectional area of the blade changes significantly, for example where the cross-sectional area increases. In this way the insert can be used in place of needing multiple additional layers of textile in the situation where the blade is made only from textile composite material. Using a blade insert where the cross-sectional area of the blade increases can allow drop-off plies to be avoided. By using a blade insert comprising a chopped fibre composite at a location where the blade cross-section increases and/or decreases then the shape of the blade can be formed more smoothly and the need for ply drop-off can be avoided.

In one example the blade insert is located at the root of the blade where the cross-section increases compared to the cross-section of the airfoil. With the use of layers to build up the shape of a blade root there will often be a stepped arrangement of layers with drop-off plies, and this can give rise to weaknesses and stress concentrations. Using a blade insert at the root avoids such problems and also allows the shape of the root to be formed more accurately, since the blade insert may have a smooth curved surface without any steps.

The blade insert may be shaped such that the final shape of the blade can be formed by the use of multiple continuous textile layers extending from the root to the airfoil tip. That is to say, the blade insert may be shaped to avoid or minimise the use of stepped plies in the textile composite, at least at the blade root, by using the blade insert to take up all of the increase in cross-section at the root, such that the textile composite of the airfoil can continue to form the remainder of the root without the need for additional layers of textile composite to increase the cross-sectional area at the root. The blade insert for the root may hence have a taper at the airfoil end of the insert with decreasing cross-section toward the airfoil end. The taper may be a curved taper reflecting a curved shape at a shoulder of the airfoil root. The blade insert for the root may extend further toward the airfoil tip at its centre when the airfoil has a thicker cross-section toward the centre of the airfoil. Thus, the blade insert may have a dorsal fin shape with the upper tip of the dorsal fin shape extending into the airfoil from the root along the centre line of the airfoil.

In some examples the blade insert is manufactured in multiple parts and then assembled together before it is surrounded by the textile layers. For example, there may be two or three parts that make up the blade insert. These parts may be assembled in close contact and they may be coupled together during the manufacturing process. For example a step of coupling parts of the blade insert together may include: joining adjacent parts using a plug-and-socket arrangement and/or friction fit; joining adjacent parts using adhesives or welding such as ultrasound welding; and/or consolidation of adjacent parts during thermoforming or otherwise using heat and pressure to fuse adjacent parts together. Making the blade insert from multiple parts can give further advantages in terms of ease of manufacture and/or the ability to form complex shapes.

The method may include using a mould to form the shape of the blade. In particular, the method may include lay-up of the textile layers in a mould in order to form a required shape for the blade. The blade insert may be placed in the mould when some of the textile layers are present, with other textile layers then being placed over the blade insert in order to surround the blade insert with the textile layers being on at least two sides of the blade insert. In one example the method includes carrying out the surrounding step of the first aspect by placing a number of the textile layers into a bottom mould, placing the blade insert into the mould on top of the textile layers, and then placing further layers on top of the blade insert. A top mould may be used to ensure that the textile layers form the required shape both above and below the blade insert. The further textile layers may first be placed onto the blade insert on top of the bottom mould, with the top mould being applied after the further textile layers are placed onto the blade insert, or alternatively some or all of the further textile layers may be placed into the top mould and applied to the other parts in the bottom mould by joining the top and bottom mould together. After the textile layers and blade insert are assembled together, with addition of a matrix for the textile composite as appropriate, then the thermoforming step can be carried out. The top mould and bottom mould may together form the thermoforming mould. The matrix may advantageously be a thermoplastic material.

The textile layers and/or the blade insert may be joined prior to thermoforming, for example by stitching or by welding. Ultrasound welding may be used to join the textile layers after they have been placed into the mould(s).

The textile may be any suitable textile type. As is known in the art various types of carbon fibres may be used. The matrix used with the textile layers is advantageously a thermoplastic matrix and may be any suitable type, such as PEEK, PEKK, PEI, PPS and so on. The textile may consist of unidirectional fibres, woven fibres or a film with embedded fibres. When woven fibres are used then the weave pattern may include three dimensional weaving. The textile composite material uses long fibres that may extend the full length and width of the final blade, or at least are significantly longer than the chopped fibres of the blade insert, for example at least three or at least four times as long. The textile and the matrix may be provided together such as via pre-preg materials, consolidated plates, co-mingled materials, woven powdered materials or woven composite materials. Alternatively the textile and the matrix for the textile composite material may be provided separately, such as by applying the matrix material to each layer as the layers of textile are built up. The method may include using combinations of different textile types and different techniques for applying the textile layers in order to provide different load bearing properties for different zones of the blade after manufacture.

The textile composite may be a woven textile composite. For example, it may be a fabric structure and the method may comprise forming such a fabric structure, or using a previously formed structure. A fabric structure that may be used as the textile composite may be formed by combining yarns including both reinforcing material filaments and a matrix material with yarns of reinforcing material filaments and/or yarns including at least one filament of matrix material; or combining yarns of reinforcing material filaments with yarns including at least one filament of matrix material; or combining yarns each comprising both reinforcing material filaments and matrix material. The reinforcing material filaments of the fabric structure may be equivalent to the fibres described herein.

Thus, yarns including both reinforcing material filaments and a matrix material may be combined with yarns of reinforcing material filaments. Yarns including both reinforcing material filaments and a matrix material may be combined with yarns including at least one filament of matrix material. Yarns of reinforcing material filaments may be combined with yarns including at least one filament of matrix material. Yarns each comprising both reinforcing material filaments and matrix material may be combined with other yarns each comprising both reinforcing material filaments and matrix material. Combining may comprise weaving, knitting or braiding. Weaving may comprise weaving two-dimensional layers. In this case, the method may further comprise stitching layers together into a three-dimensional woven structure. Alternatively weaving, knitting or braiding may comprise three-dimensional weaving, knitting or braiding techniques to form a three-dimensional fabric structure. 3D weaving may be 3D interlock weaving.

The fibres and matrix of the blade insert may be any suitable type of materials such as those discussed above in relation to the fibre and matrix for the textile composite material. The blade insert uses chopped fibres, i.e. short fibres, which are hence shorter than the fibres of the textile composite material. The chopped fibres of the blade insert may be oriented relative to one another according to structural and dynamic loads on the blade insert when the blade is in use after manufacture. For example, the fibres may in some cases be aligned with a principle load direction. Where the blade insert is used in the root of the blade then the loads on the blade insert will be primarily compressive. In this case the chopped fibres may be randomly oriented. Where the blade insert comprises multiple parts then the fibres may have the same orientation in each part, or in some cases they may have differing orientations. The matrix material of the blade insert may usefully be able to join effectively to the matrix material of the surrounding textile composite in order to ensure adequate consolidation of the blade insert with the surrounding textile composite material. In example implementations the same material is used for the matrix of the blade insert and for the matrix of the surrounding textile composite in order to ensure that a strong join can be made between the composites, for example during consolidation via thermoforming.

The step of thermoforming may include applying a cycle with several different pressures and/or temperatures. The thermoforming step may include applying heat and/or pressure to the blade to consolidate the various composite materials, as well as using heat and then cooling to cure the matrix material, which can be a thermoplastic material. For example, the thermoforming may include gradually raising the temperature to a forming temperature whilst the pressure remains unchanged, holding the temperature at the forming temperature whilst the pressure is increased to a forming pressure, and then gradually reducing the temperature to ambient temperature. The pressure may be increased gradually or in step changes. The forming temperature will typically be a temperature at which the matrix material(s) of the blade insert and the textile composite material become pliable and may be a temperature at which the material(s) can be fused together. The forming temperature will hence be above the glass transition temperature of the matrix material(s) and may be above a softening and/or melting point temperature of the matrix material(s).

The method may include other steps to produce the composite blade. For example, the method may include removal of the part from the mould after thermoforming and subsequent machining of features of the blade to obtain a final shape. A leading edge and/or a tip cap may be added with the leading edge and/or tip cap being made of a different material to the remainder of the blade as is known in this field. The leading edge and/or the tip cap may be joined to the remainder of the blade by means of a surface matrix film. Additional layers such as over-moulded layers, coatings or films may be added after thermoforming. Where the textile composite material uses a thermoplastic such as PEEK then the method may include over-moulding with the same thermoplastic. This can provide a greater erosion resistance than other coatings whilst also ensuring secure adhesion of the outer layer to the textile composite material and avoiding the use of adhesive.

The blade may be a fan blade for a gas turbine engine such as an aircraft jet engine. Thus, the method may be a method for manufacture of a composite fan blade or a gas turbine engine such as an aircraft jet engine. A method of manufacturing such a gas turbine engine may include assembling a plurality of the composite fan blades with a rotor disc of the engine. Alternatively the blade may be a propeller blade, and thus the method may be a method for manufacture of a composite propeller blade.

Viewed from a second aspect, the invention provides a composite blade with an airfoil and a root, the blade comprising: a textile composite outer casing that surrounds a chopped fibre blade insert. The outer casing may surround the blade insert by being sandwiched around it across a length and width of the blade, and optionally the outer casing may fully encase the blade insert and be placed around it on all sides including the length and width of the blade as well as its depth. The blade may have been manufactured in accordance with the first aspect, and thus may comprise a textile composite outer casing that surrounds a chopped fibre blade insert wherein during manufacture the blade insert has been surrounded with a plurality of layers of a textile in a textile composite material this assembly has been thermoformed in a thermoforming mould in order to consolidate the part.

The blade insert may be an insert for location in the root of the blade at a point where the cross-sectional area of the blade increases compared to the airfoil. The blade insert may have been formed as discussed above, and thus the blade may comprise a chopped fibre composite insert that has been moulded and optionally machined. This insert may be in several parts that have been assembled together during manufacture. The textile layers and/or the blade insert may have been joined prior to the thermoforming, for example the blade may include joins formed by stitching or by welding.

The textile may be any suitable textile type. As is known in the art various types of carbon fibres may be used. The matrix used with the textile layers is advantageously a thermoplastic matrix and may be any suitable type, such as PEEK, PEKK, PEI, PPS and so on. The textile may consist of unidirectional fibres, woven fibres or a film with embedded fibres. When woven fibres are used then the weave pattern may include three dimensional weaving. The textile composite material uses long fibres that may extend the full length and width of the final blade, or at least are significantly longer than the chopped fibres of the blade insert, for example at least three or at least four times as long. The textile and the matrix may have been provided together during manufacture such as via pre-preg materials, consolidated plates, co-mingled materials, woven powdered materials or woven composite materials. Alternatively the textile and the matrix for the textile composite material may have been provided separately, such as by applying the matrix material to each layer as the layers of textile are built up or by using resin transfer manufacturing (RTM) techniques. The blade may include different zones that have been formed using combinations of different textile types and different techniques for applying the textile layers in order to provide different load bearing properties for the different zones of the blade.

The textile composite material may be a fabric structure comprising reinforcing filaments and a matrix material. Thus, the matrix material of the fabric structure may be combined within an initial fabric structure, e.g. a preform, which is then used in the manufacture of an aircraft blade. The textile composite material may be a three dimensional woven fabric structure including carbon fibres as well as thermoplastic fibres.

The fabric structure may comprise: yarns including both reinforcing material filaments and a matrix material combined with yarns of reinforcing material filaments and/or yarns including at least one filament of matrix material; or yarns of reinforcing material filaments combined with yarns including at least one filament of matrix material; or yarns comprising both reinforcing material filaments and a matrix material combined with other yarns comprising both reinforcing material filaments and a matrix material. The reinforcing material filaments of the fabric structure may be equivalent to the fibres described herein. The combined yarns may be combined into a woven, knitted or braided fabric structure that is used as the textile composite material. In other words, the yarns may be woven, knitted or braided together. A woven fabric structure may comprise multiple two-dimensional woven layers which are stitched together into a three-dimensional woven structure. Or alternatively, the fabric structure may be a three-dimensional woven, knitted or braided fabric. A 3D woven structure may be a 3D interlock structure. This may be termed a 3D interlock woven fabric.

The fibres and matrix of the blade insert may be any suitable type of materials such as those discussed above in relation to the fibre and matrix for the textile composite material. The blade insert uses chopped fibres, i.e. short fibres, which are hence shorter than the fibres of the textile composite material. The chopped fibres of the blade insert may be oriented relative to one another according to structural and dynamic loads on the blade insert when the blade is in use after manufacture. For example, the fibres may in some cases be aligned with a principle load direction. Alternatively, the fibres may be randomly oriented. Where the blade insert comprises multiple parts then the fibres may have the same orientation in each part, or in some cases they may have differing orientations. The matrix material of the blade insert may usefully be able to join effectively to the matrix material of the surrounding textile composite in order to ensure adequate consolidation of the blade insert with the surrounding textile composite material. In example implementations the same material is used for the matrix of the blade insert and for the matrix of the surrounding textile composite in order to ensure that a strong join can be made between the composites, for example during consolidation via thermoforming.

The step of thermoforming may be carried out as described above.

The blade may comprise leading edge and/or a tip cap with the leading edge and/or tip cap being made of a different material to the remainder of the blade. The leading edge and/or the tip cap may be joined to the remainder of the blade by means of a surface matrix film. Additional outer layers such as over-moulded layers, coatings or films may be present, as discussed above.

The blade may be a fan blade for a gas turbine engine such as an aircraft jet engine. Thus, a gas turbine engine may include a plurality of the composite fan blades. Alternatively, the blade may be a propeller blade for an aircraft.

BRIEF DESCRIPTION OF THE DRAWINGS

Certain preferred embodiments of the invention will now be described by way of example only and with reference to the accompanying drawings, in which.

DETAILED DESCRIPTION

Figure 1:
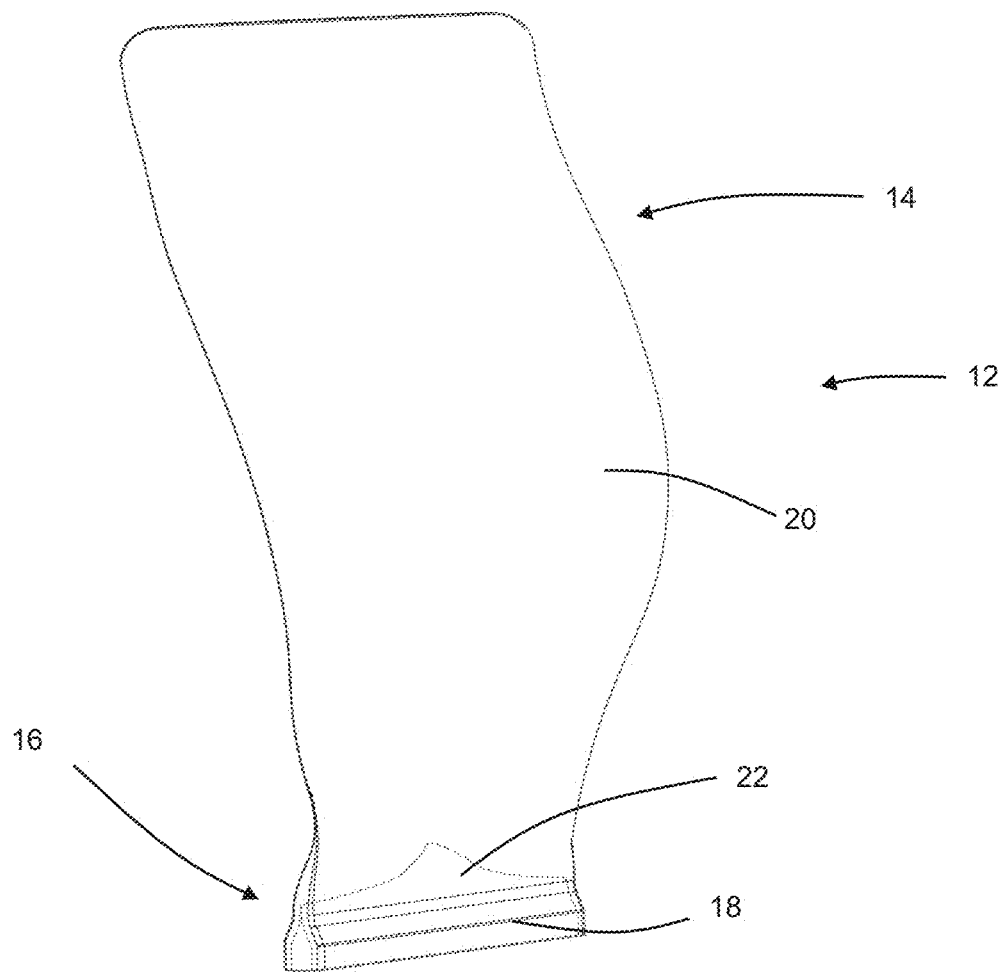
FIG. 1 shows a fan blade with a blade insert in the root.
Figure 2:
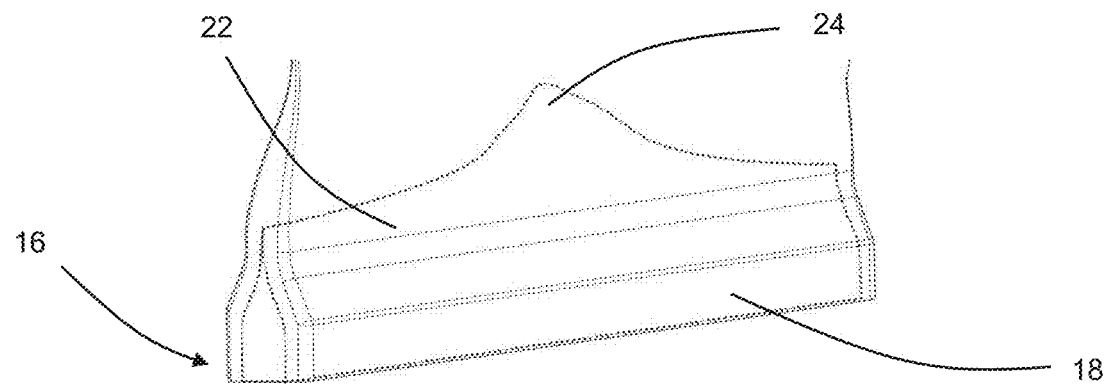
FIG. 2 shows a close up view of the root in FIG. 1.

The invention is described by way of example in the context of a fan blade 12 having a blade insert 18 in the root 16. It will be appreciated that a similar construction could also be used with a propeller blade. As shown in FIGS. 1 and 2 a composite fan blade 12 has an airfoil 14 and a root 16. The fan blade comprises a textile composite outer casing 20 that forms the airfoil 14 and that surrounds a chopped fibre blade insert 18 in the root 16. The example fan blade 12 is a fan blade for a gas turbine engine such as an aircraft jet engine. The fan blade 12 may be manufactured by forming a blade insert 18 using chopped fibre composite; surrounding the blade insert 18 with a plurality of layers of a textile in a textile composite material 20; and thermoforming the blade insert 18 and the surrounding textile composite material 20 in a thermoforming mould in order to consolidate the part.

The blade insert 18 may be formed by moulding in order to provide it with a required shape, which may for example be a contoured shape reflecting the required final contoured shape of the blade root 16. Forming the blade insert 18 may include machining steps. In some examples the blade insert 18 is manufactured in multiple parts and then assembled together before it is surrounded by the textile layers 20.

The blade insert 18 in this example sits within the blade root 16 where the cross-section of the blade increases compared to the airfoil 14. The insert 18 is arranged to span the majority of the width of the blade root 16 and it has a cross-section with a tapering part 22 extending toward the airfoil 14. This taper 22 can be seen in the perspective views of FIGS. 1 and 2, as well as being shown in cross-section in FIGS. 4 and 5. The extent of the taper 22 varies across the width if the insert since the airfoil 14 has a thicker cross-section along its centre-line. As a consequence of this the tapered part 22 includes a dorsal fin shape 24 at the mid-point of the insert.

Figure 3:
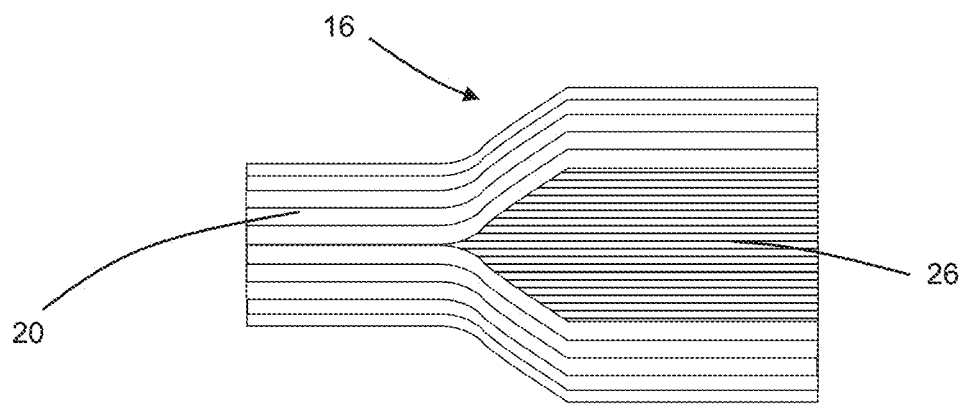
FIG. 3 is a schematic drawing of a prior art blade root formed with textile composite layers.
Figure 4:
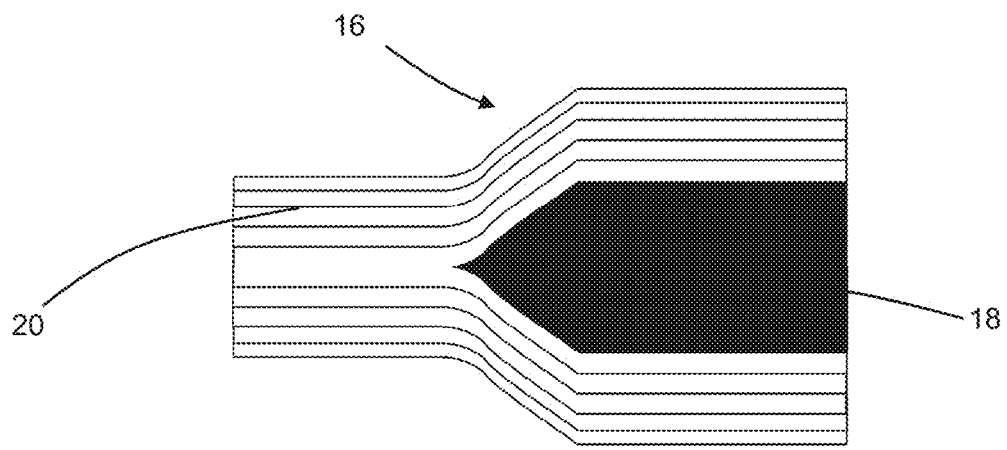
FIG. 4 shows the use of an insert in the blade root to replace stepped layers of textile composite.
Figure 5:
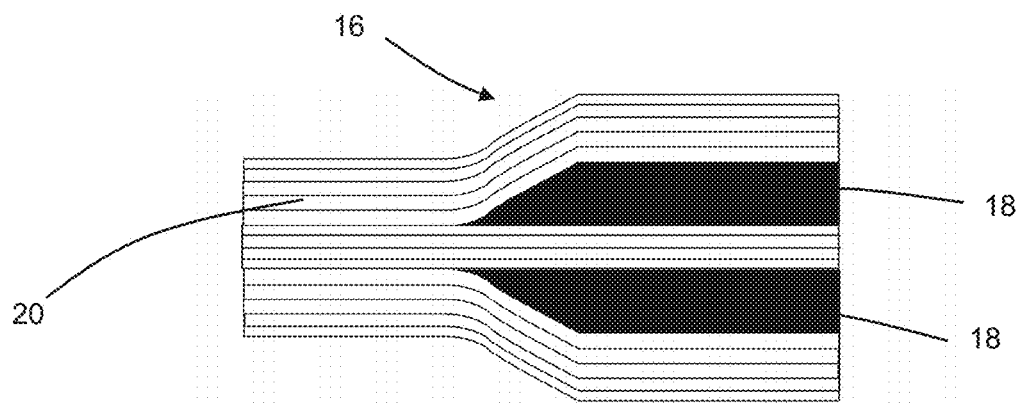
FIG. 5 shows the use of a two-part blade insert in the root.

FIG. 3 shows a prior art arrangement where there is no chopped fibre insert 18. It will be seen that in order to allow for the difference in cross-section at the root 16 there is a need for numerous stepped layers 26 with drop-off plies. As explained above, there are disadvantages to this arrangement. FIG. 4 shows a similar cross-section to FIG. 3 where the proposed chopped fibre insert 18 is used at the blade root 14. The chopped fibre insert 18 can be accurately shaped using a curved and tapered section 22 without any steps, and this can fit tightly with the textile layers 20 to form the required root cross-section. FIG. 4 shows a single piece insert 18. An alternative arrangement uses a multi-part insert 18, such as an arrangement as shown in FIG. 5.

A mould is used to form the shape of the fan blade 12. In one example the method of manufacturing the fan blade 12 includes placing a number of the textile layers 20 into a bottom mould, placing the blade insert 18 into the mould on top of the textile layers 20 at the root portion 16 of the blade 12, and then placing further layers 20 to complete the airfoil section 14 and to encase blade insert 18 by placing them on top of the blade insert 18. A top mould is used to ensure that the textile layers 20 form the required shape both above and below the blade insert 18 at the root 16 as well as at the airfoil section 14. The further textile layers 20 may first be placed onto the blade insert 18 on top of the bottom mould, with the top mould being applied after the further textile layers 20 are placed onto the blade insert 18, or alternatively some or all of the further textile layers 20 may be placed into the top mould and applied to the other parts in the bottom mould by joining the top and bottom mould together. After the textile layers 20 and blade insert 18 are assembled together, with addition of a matrix for the textile composite 20 as appropriate, then the thermoforming step can be carried out. The thermoforming mould used in the thermoforming step is formed by the combination of the top mould and the bottom mould.

The textile composite material can be a three dimensional woven textile including carbon fibres as well as thermoplastic fibres. In one example the textile composite material includes a fabric structure comprising: yarns including both reinforcing material filaments and a matrix material combined with yarns of reinforcing material filaments and/or yarns including at least one filament of matrix material; or yarns of reinforcing material filaments combined with yarns including at least one filament of matrix material; or yarns comprising both reinforcing material filaments and a matrix material combined with other yarns comprising both reinforcing material filaments and a matrix material.

The fan blade insert in this example uses chopped fibre carbon fibres along with a PEEK matrix. Using the same material for the matrix as is used for the textile composite allows for better consolidation of the fan blade during thermoforming. It will be appreciated that other thermoplastic materials that PEEK could alternatively be used for the matrix of the insert and the textile composite.

Figure 6:
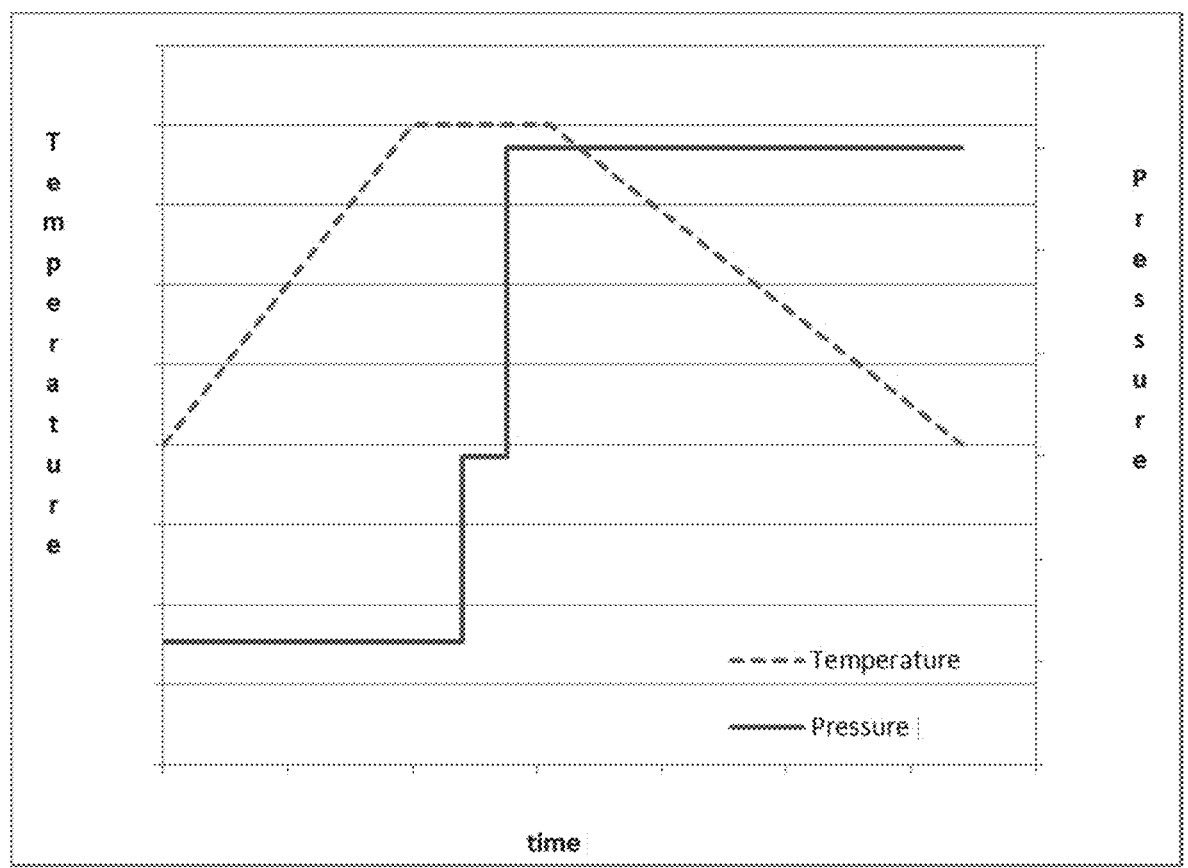
FIG. 6 shows a thermoforming temperature and pressure profile.

The thermoforming cycle can be as shown in FIG. 6. Thus, the thermoforming may include gradually raising the temperature to a forming temperature whilst the pressure remains unchanged, holding the temperature at the forming temperature whilst the pressure is increased in step changes through to a forming pressure, and then gradually reducing the temperature to ambient temperature. The forming temperature may be a temperature at which the thermoplastic softens sufficiently, or melts.

After thermoforming the fan blade 12 is removed from the mould and subsequently it is machined to obtain a final shape. A leading edge and a tip cap added and are joined to the remainder of the fan blade 12 by means of a surface matrix film with a lower fusion temperature than the matrix material. Additional layers such as over-moulded layers, coatings or films may be added after thermoforming. In one example the fan blade 12 is over-moulded with a PEEK layer of similar composition to the matrix of the textile composite 20 in order to obtain superior erosion resistance and resistance to bird impact whilst also avoiding the need for adhesives.

The invention claimed is:

1. A method for manufacture of a composite blade with an airfoil and a root, the blade comprising a core of chopped fibre composite material and a textile composite material encasing the chopped fibre core, the method comprising:
   forming a blade insert using chopped fibre composite;
   surrounding the blade insert with a plurality of layers of a textile in a textile composite material; and
   thermoforming the blade insert and the surrounding textile composite material in a thermoforming mould in order to consolidate the part;
   wherein the blade insert is shaped such that it extends farther toward a tip of the airfoil at its centre in a dorsal fin shape with an upper tip of the dorsal fin shape extending into the airfoil from the root along a centre line of the airfoil.

2. A method as claimed in claim 1, wherein the blade insert is formed by at least one of moulding and machining in order to provide it with a required shape reflecting a required final contoured shape of the part of the blade where the blade insert is located.

3. A method as claimed in claim 1, wherein the blade insert is shaped such that the final shape of the blade can be formed by the use of multiple continuous textile layers extending from the root to the airfoil tip.

4. A method as claimed in claim 1, wherein the blade insert is situated at a location where the cross-sectional area of the blade changes.

5. A method as claimed in claim 4, wherein the blade insert is located at the root of the blade where the cross-section increases compared to the cross-section of the airfoil.

6. A method as claimed in claim 5, wherein the blade insert has a taper at the airfoil end of the insert with decreasing cross-section toward the airfoil end.

7. A method as claimed in claim 1, where the surrounding step comprises: placing a number of the textile layers into a bottom mould, placing the blade insert into the mould on top of the textile layers, and then placing further layers on top of the blade insert.

8. A method as claimed in claim 7, wherein a top mould is used to ensure that the textile layers form the required shape both above and below the blade insert, wherein the top mould and bottom mould together form the thermoforming mould.

9. A method as claimed in claim 1, wherein the textile composite material includes a fabric structure comprising: yarns including both reinforcing material filaments and a matrix material combined with yarns of reinforcing material filaments and/or yarns including at least one filament of matrix material; or yarns of reinforcing material filaments combined with yarns including at least one filament of matrix material; or yarns comprising both reinforcing material filaments and a matrix material combined with other yarns comprising both reinforcing material filaments and a matrix material.

10. A method as claimed in claim 1, wherein the same material is used for the matrix of the blade insert and for the matrix of the surrounding textile composite.

11. A method for manufacture of a composite blade with an airfoil and a root, the blade comprising a core of chopped fibre composite material and a textile composite material encasing the chopped fibre core, the method comprising:
    forming a blade insert using chopped fibre composite;
    surrounding the blade insert with a plurality of layers of a textile in a textile composite material; and
    thermoforming the blade insert and the surrounding textile composite material in a thermoforming mould in order to consolidate the part;
    wherein the textile composite material uses a thermoplastic matrix and the method includes over-moulding the blade with the same thermoplastic after the thermoforming step.

12. A composite blade with an airfoil and a root, the blade comprising: a textile composite outer casing that surrounds a chopped fibre blade insert;
    wherein the chopped fiber blade insert is shaped such that it extends farther toward a type of the airfoil tip at its centre in a dorsal fin shape with an upper tip of the dorsal fin shape extending into the airfoil from the root along a centre line of the airfoil.

13. A composite blade as claimed in claim 12, the blade being formed by a method comprising: forming a blade insert using chopped fibre composite; surrounding the blade insert with a plurality of layers of a textile in a textile composite material; and thermoforming the blade insert and the surrounding textile composite material in a thermoforming mould in order to consolidate the part.

14. A composite blade as claimed in claim 12, wherein the blade insert is an insert for location in the root of the blade at a point where the cross-sectional area of the blade increases compared to the airfoil.

* * * * *